United States Patent [19]
Pauli

[11] 4,188,057
[45] Feb. 12, 1980

[54] RETRACTABLE PATIO ASSEMBLY FOR RECREATIONAL VEHICLE

[76] Inventor: Harry P. Pauli, P.O. Box 143, Burns, Wyo. 82053

[21] Appl. No.: 928,969

[22] Filed: Jun. 28, 1978

[51] Int. Cl.² .............................................. B60P 3/30
[52] U.S. Cl. .................................. 296/162; 280/166
[58] Field of Search ............... 296/23 R, 23 C, 23 G, 296/23 H; 280/163, 164, 763, 764, 765, 166; 52/64, 69

[56] References Cited

U.S. PATENT DOCUMENTS

| | | | |
|---|---|---|---|
| 2,162,181 | 6/1939 | Skinner | 280/763 |
| 2,657,940 | 11/1953 | Davidson | 280/166 |
| 3,392,990 | 7/1968 | Wolf | 280/163 |
| 3,891,261 | 6/1975 | Finneman | 280/166 |
| 3,912,298 | 10/1975 | Humphrey | 280/166 |
| 3,989,277 | 11/1976 | Stahl | 280/764 |
| 3,997,211 | 12/1976 | Graves | 296/23 G |
| 4,021,071 | 5/1977 | Norman | 280/166 |

*Primary Examiner*—Philip Goodman
*Attorney, Agent, or Firm*—Fidelman, Wolffe & Waldron

[57] ABSTRACT

A retractable patio assembly is provided for use with recreational-type vehicles. The patio is adapted for use placement in a horizontal attitude in front of and below a vehicle door and is foldable and retractable to a stowed position parallel to a vehicle side wall and laterally displaced from the use position so as to allow free door access. A plurality of individually-adjustable, ground-engaging leg members each provide at least two points of support for the patio floor thus allowing placement of the patio on uneven or sloping ground, while avoiding undue stressing of either the patio assembly or structural components of the vehicle.

10 Claims, 9 Drawing Figures

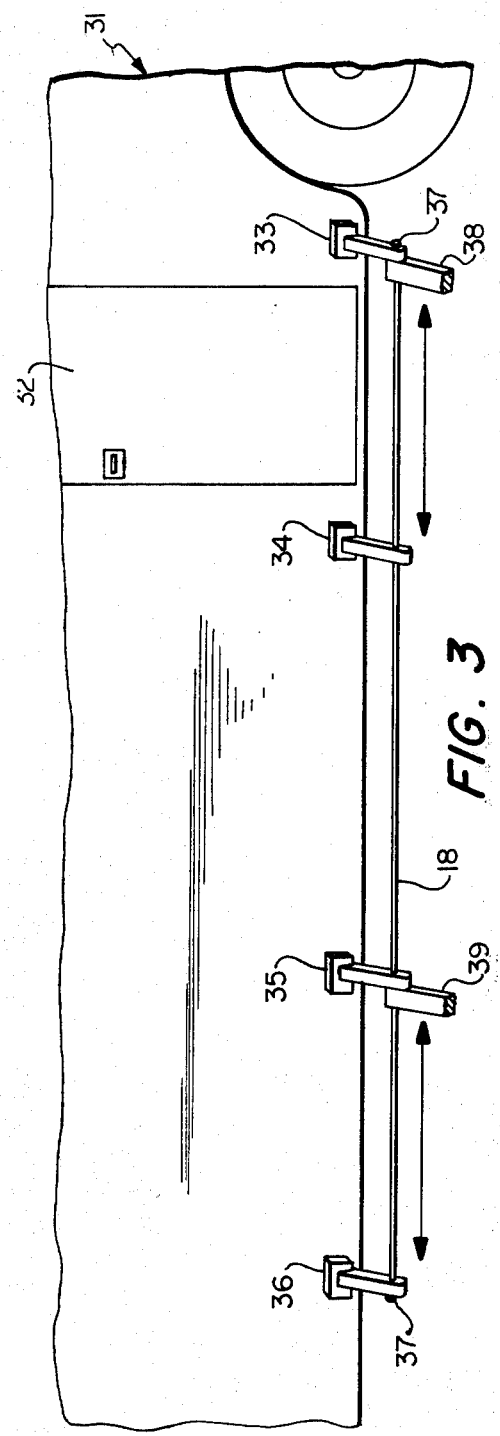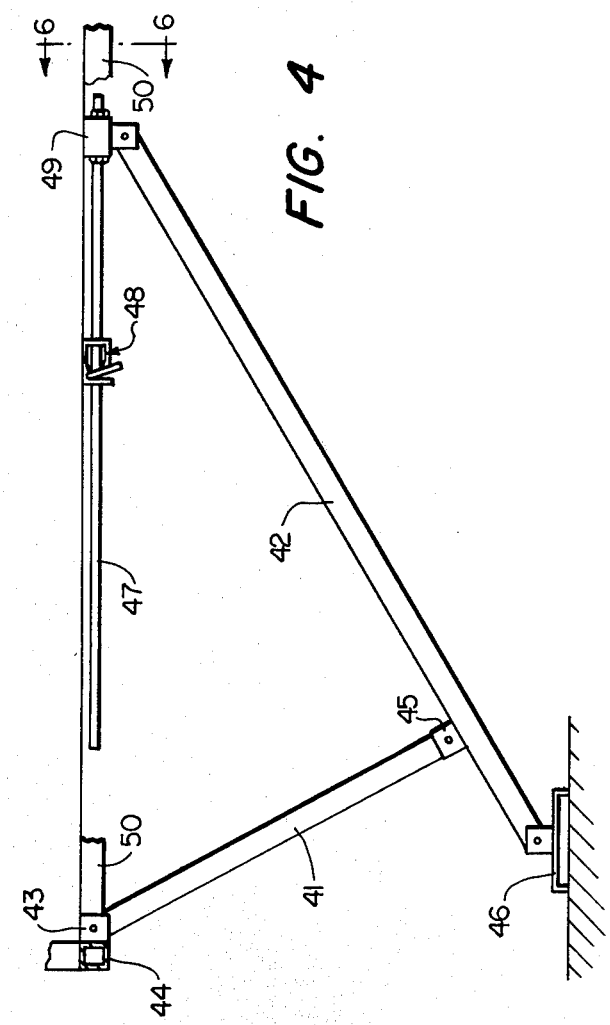

RETRACTABLE PATIO ASSEMBLY FOR RECREATIONAL VEHICLE

BACKGROUND OF THE INVENTION

This invention relates generally to retractable structures useful as accessories for recreational vehicles, such as motor homes and the like.

More particularly, this invention relates to a self storing, folding porch or patio movable from a use position in front of a vehicle door to a transport position to the side of the door.

Many different types of floor space-extending accessories for recreational type vehicles, such as campers, motor homes and trailers, have been proposed. These accessories have in common the fetures of extending to a generally horizontal use position and folding or collapsing to a retracted stowage or transport position.

One common approach used in the construction of such accessories is to provide hinged panels which open outwardly to form an extension of the floor area. In this type of construction, there must be provided some support means to hold the panels in a horizontal attitude. Support commonly is accomplished by cantilevering the panels from the sides or end of the vehicle or by providing a strut or similar member extending from an upper portion of the vehicle body to the outer side of the extended panel. While this approach works well for small patio or panel assemblies which are not subjected to undue weight, it puts unacceptable stress upon the vehicle body in the case of larger patio assemblies. The sleeper/camper attachment described in U.S. Pat. No. 3,790,207 is representative of this approach.

Another approach to providing support for an extensible floor or porch assembly is to use ground engaging legs as is illustrated by U.S. Pat. Nos. 2,786,710 and 4,027,911. Such legs, if of fixed length, are of little use to uneven or sloping ground. Adjustable legs have been proposed and these are typically in the form of tubular columns as is illustrated in the cited patents. This construction precludes attainment of any substantial rigidity unless very heavy components are used. As lightness is very important to the convenient placement and stowage of all but the smallest of patio or porch assemblies, columnar legs represent a compromise at best.

With the advent of regulations requiring free door access to vehicles at all times, there has been proposed patio assemblies which are laterally movable so as to allow stowage to the side of the door. A small patio assembly for use on a pickup truck having a camper body and stowable to the side of the door is described in U.S. Pat. No. 3,997,211. The described patio assembly utilizes trussed steps or stairs to support the outer side of the patio floor. While this approach is satisfactory for a relatively small and high placed platform, it is inadequate for use with a wider and lower mounted patio floor useful as a motor home accessory.

SUMMARY OF THE INVENTION

This invention provides for a retractable patio assembly particularly adapted for use adjacent a side door of a motor home or similar recreational vehicle. The patio floor platform is adapted to be attached to the side of the vehicle and is laterally movable so as to be positioned beneath the door in a horizontal use attitude and hung alongside but free of the door in a stowed or transport position. Triangular leg assemblies provide multipoint support to the floor platform and are adjustable to any height from fully retracted to fully extended so as to allow placement of the patio on uneven or sloping ground. Also arranged on the platform sides are railings which fold onto the top floor platform and optionally a platform supported step which foldably rests on the underside of the platform. The entire assembly folds and pivots to be stowable on the vehicle side wall, thus reducing to a minimum the width added to the vehicle.

It is an object of this invention to provide a retractable patio assembly for a recreational vehicle.

Another object of this invention is to provide a relatively large patio assembly adopted for use on uneven or sloping ground.

Yet another object of this invention is to provide increased support and rigidity to the floor platform of a laterally movable patio assembly.

BRIEF DESCRIPTION OF THE DRAWING

FIG. 3 is a perspective view of the mounting and lateral shifting means in position on a recreational vehicle.

FIG. 4 is a detail view of the adjustable, gound engaging platform support means.

DETAILED DESCRIPTION OF THE INVENTION

Figure 1:
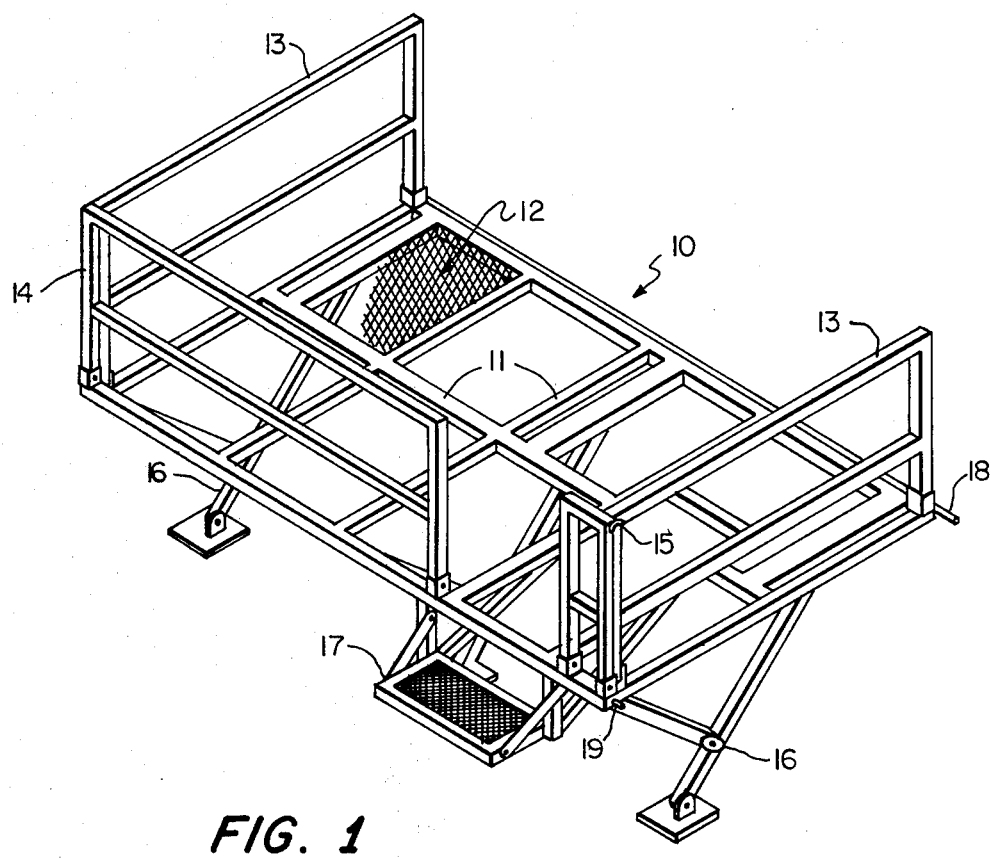
FIG. 1 is a perspective view of the patio assembly of this invention in its open or use position.

Referring initially to FIG. 1, the patio assembly, designated generally at 10, is shown in open or use position. The patio assembly comprises a floor platform having a structural framework 11 supporting an open mesh expanded metal flooring or like material 12. Pivotally mounted to the floor platform are side railings 13 and front railings 14. Both side and front railings hingably fold inwardly to rest upon the floor platform when in the stowed or retracted position and are secured in a vertical position by locking lug 15 when in the use position.

Figure 5:
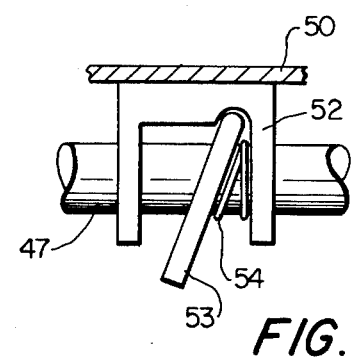
FIG. 5 is an enlarged, detail view of the adjustment locking means of FIG. 4.

A plurality of ground-engaging leg assemblies 16 support the platform in a horizontal attitude. Each leg member provides a multi-point support for the floor platform and is individually adjustable to accommodate use on sloping or uneven ground. Details of leg member construction are shown in FIGS. 4 and 5.

In a preferred embodiment, there is provided a step assembly 17, extensible to a position forward of the front of the floor platform. The step assembly is hingably arranged to nest adjacent the bottom side of the floor platform when in a stowed position. The rear of the floor platform is slidably mounted by means of brackets on traverse rod 18. Traverse rod 18 in turn is supported by lugs attached to structural members of the recreational vehicle as is shown in FIG. 3.

Figure 2:
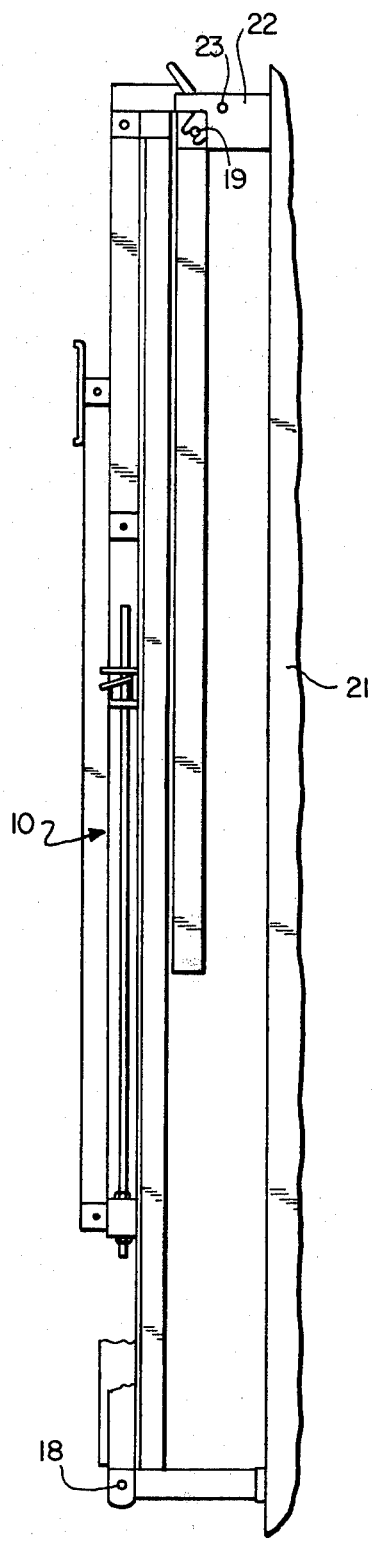
FIG. 2 is a partial rear elevation view of the patio assembly in its stowed and retracted position mounted to the side of a recreational vehicle.

FIG. 2 illustrates in a partial rear elevation view the patio assembly 10 in its folded and stowed position adjacent and parallel to the side 21 of a recreational vehicle. The patio assembly is transferred from its use position, shown in FIG. 1, to a stowed or transport position, shown in FIG. 2, by first releasing locking lugs 15 and then folding the side railings 13 and front railings 14 inwardly to rest upon the floor platform. The folded assembly is then slid laterally from a use position in front of the vehicle door to the side of the door. Thereafter, the assembly is pivoted upwardly about traverse rod 18 to a vertical position and is secured in that position by locking or keeper member 22 which in turn is mounted on the vehicle side and engages with pin 19 secured to the side front of the floor platform. Keeper 22 may be provided with securing means such as a padlock mounted through opening 23.

FIG. 3 depicts the mounting means for attachment of the patio assembly to a vehicle. The vehicle, designated generally at 31, is conventionally equipped with a side door 32. A plurality of traverse rod support lugs 33, 34, 35 and 36 are fixably mounted to the frame of vehicle 31. The support lugs may conveniently be either three or four in number. When four support lugs are used, they are preferably spaced in a paired relationship. As illustrated in FIG. 3, a first pair of lugs 33 and 34 are mounted one on either side of door 32. The second pair, lugs 35 and 36, are mounted at least the width of door 32 apart and preferably at the same spacing as the first pair. Distance between lug pairs is set by the width of the patio assembly.

Each of the lugs is bored near its terminal point to accept passage of traverse rod 18. Rod 18 is secured in position by locking nuts or keepers 37. Pivotally mounted on rod 18 are structural members 38 and 39, one between each lug pair. Members 38 and 39 preferably form the end beams for the structural framework 11 of the floor platform. Members 38 and 39 are also free to slide transversely along rod 18 as depicted by the arrows. Thus, in a use position, members 38 and 39 are placed adjacent lugs 33 and 35 respectively and are shifted laterally to a position adjacent lugs 34 and 36 for stowage and transport. In this way, the floor platform is located beneath door 32 during use and the patio assembly, when retracted, leaves the door unobstructed as is required by regulation.

Referring now to FIG. 4, there is shown in detail the structure of leg assembly 16. The assembly comprises a short arm member 41 and a longer arm member 42. Arm member 41 is pivotally connected at its upper end to a bracket 43 attached to beam 44 which beam forms the front structural member of framework 11. Arm 41 is pivotally connected at its lower end to bracket 45 attached to the upper side of arm 42 at a point intermediate the ends. Arm 42 in turn is swingably attached at its lower end to ground support pad 46.

Disposed parallel to the underside of the floor platform is slide rod 47 which makes up the third arm of the triangular leg assembly. Rod 47 is adjustably engaged by slide catch 48 as is shown in greater detail in FIG. 5. One end of rod 47 is free and the other terminates in a lug and bracket assembly 49 which is hingably connected to the upper end of arm 42. Slide catch 48 is fixably mounted to structural member 50 which forms a part of framework 11 of the floor platform while assembly 49 is free to engagably slide along member 50.

Slide catch 48, shown in detail in FIG. 5, may comprise a frame member 52 fixably attached as by welding to structural member 50. Frame 52 is drilled to allow slidable passage of rod 47 which is releasably held in any desired position by the action of locking leaf 53 and leaf spring 54. Leaf 53, when in a slanting position, secures rod 47 but allows slidable movement of the rod when in a vertical position.

Figure 6:
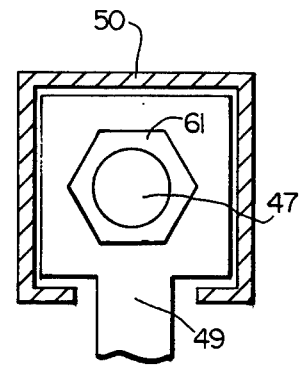
FIG. 6 is a sectional view of a slide channel support member in cooperation with the leg assembly.

FIG. 6 is a sectional end view of structural member 50 showing its relationship with lug and bracket assembly 49. Slide rod 47 is fixably attached to assembly 49 as by locking nut 61. Member 50 may comprise a slotted box beam as is illustrated or may comprise other geometrical shapes which provide both vertical support for assembly 49 and allow the assembly to engagably slide along the member.

As may be appreciated, movement of rod 47 relative to slide catch 48 allows adjustment of the leg assembly from a fully retracted to a fully extended position. At the same time and in any ground-engaging position, the leg assembly provides multi-point support to the floor platform. One support point is fixed at the juncture of the shorter arm member and the platform edge and another major support point is formed at the locus of assembly 49 and member 50. It is preferred that the lengths of arms 41 and 42 have such a relationship that the locus of the second support point falls about midway between the vehicle and the patio edge at normal leg extension. In addition to the features of adjustability and multi-point support, the triangular structure of the leg assembly provides a rigidity to the patio assembly not obtainable with column-type leg members. In a preferred embodiment, three leg assemblies are provided to support the floor platform. However, the number of leg assemblies utilized also depends upon the rigidity required of the floor platform and upon its size.

Figure 7:
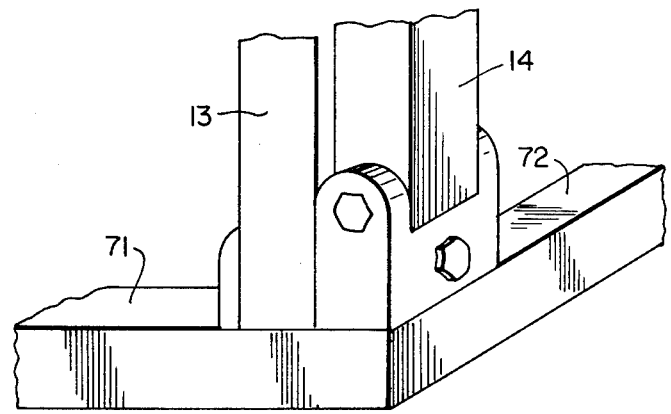
FIG. 7 is an enlarged, detail view of an outer platform corner showing the relationship of the railings to the platform base.

Turning now to FIG. 7, there is shown a detailed view of an outer floor platform corner. Side railing 13 is pivotally connected to a structural member 71 of framework 11. Front railing 14 is pivotally connected to a front structural member 72 of the floor platform. The pivot or hinge points of the side and front railings are offset vertically to allow a folding of one railing stop the other when the patio assembly is in a stowed position.

Figure 8:
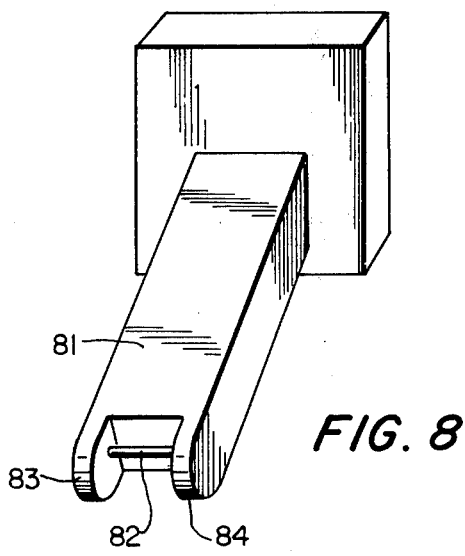
FIG. 8 illustrates an alternative bracket means for attachment of the patio assembly to a vehicle.
Figure 9:
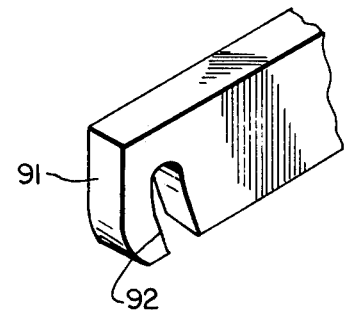
FIG. 9 illustrates a lug member engagable with the bracket means of FIG. 7.

In another embodiment of the invention, there can be substituted the bracket means of FIG. 8 and the lug member of FIG. 9 for the traverse rod 18 and its associated support lugs 33, 34, 35 and 36. In this embodiments, bracket 81, having a pin member 82 fixed between ears 83 and 84, may be mounted to a vehicle frame. Lugs 91, each having a pin-engaging slot 92, form the terminus of structural members making up the floor platform and the patio assembly is shifted laterally along the vehicle side by physically moving the patio assembly into engagement with different groups of brackets.

In a typical commercial embodiment of this invention, the floor platform may be about four feet wide and eight feet long. Structural members are preferably aluminum to conserve weight. The leg assemblies are adjustable to any vertical position from 3 to 20 inches, thus facilitating use on any terrain. Expanded metal mesh is used as the patio flooring which allows convenient cleaning of shoes or boots before entry into the vehicle. In a retracted and stowed position, the patio assembly adds about 5 inches to total vehicle width allowing a motor home to stay well within the 8' 6" total width highway requirements. Because of the light weight resulting from this patio design, one person can easily transfer the assembly between the service and stowed positions.

I claim:

1. A retractable patio assembly for use with a recreational-type vehicle and movable from a use position adjacent a door of said vehicle to a stowed position to the side of said door comprising:

mounting means attachable to a structural member of said vehicle;

platform means pivotally connected to said mounting means, said platform means being laterally movable from a substantially horizontal use position in front of and below the vehicle door to a substantially vertical retracted position alongside the vehicle door; and a plurality of individually adjustable, ground engaging platform support means, each of said support means providing at least two points of support to said platform and comprising three arm members arranged to form a triangle, a first of said arm members pivotally connected at one end to the platform and pivotally connected at the other end to a second of said arm members at a point intermediate its ends, the third arm member being of adjustable length and disposed parallel to the platform means.

2. The assembly of claim 1 wherein the first two of said arm members are of fixed length.

3. The assembly of claim 2 wherein a ground support pad is swingably attached to an end of the second of said fixed length arm members.

4. The assembly of claim 3 wherein said adjustable length arm member comprises a rod disposed parallel to the underside of said platform, said rod being adjustably engaged by a catch means adapted to lock said rod at points along its length.

5. The assembly of claim 4 wherein one end of said adjustable length arm member is pivotally attached by lug and bracket means to the upper end of the second of said fixed length arm members and wherein said lug means is adapted to engagably slide along a structural member of said platform.

6. the assembly of claim 5 wherein the first of said fixed length arm members is shorter than the other and wherein one end of said shorter member is pivotally connected to an outer edge of said platform.

7. The assembly of claim 1 wherein said mounting means comprise a plurality of lugs fixed to said vehicle, a traverse rod held by said lugs in a parallel spaced relationship with a vehicle wall and means to pivotally attach a margin of said platform to said traverse rod, said attachment means adapted to allow lateral movement of the platform along said rod for a distance at least as great as the width of the vehicle door.

8. The assembly of claim 7 wherein said attachment means comprise structural members framing said platform.

9. The assembly of claim 8 including railing means foldably attached to a margin of said platform and arranged to lock into a first upstanding position and nest into a second folded position atop said platform.

10. The assembly of claim 1 wherein said mounting means comprise a plurality of bracket members fixed to said vehicle, each of said brackets carrying a pin member fixed adjacent the bracket end and pin engaging members attached to said platform and adapted to allow pivoting of said platform from a substantially horizontal to a vertical position.

* * * * *